(12) United States Patent
Bland et al.

(10) Patent No.: US 11,064,795 B2
(45) Date of Patent: Jul. 20, 2021

(54) COLLAPSIBLE STOOL ENTERTAINMENT SYSTEM

(71) Applicants: James Bland, Modesto, CA (US); Monique Steens, Modesto, CA (US); James Bland, Jr., Modesto, CA (US)

(72) Inventors: James Bland, Modesto, CA (US); Monique Steens, Modesto, CA (US); James Bland, Jr., Modesto, CA (US)

( * ) Notice: Subject to any disclaimer, the term of this patent is extended or adjusted under 35 U.S.C. 154(b) by 0 days.

(21) Appl. No.: 16/707,091

(22) Filed: Dec. 9, 2019

(65) Prior Publication Data
US 2020/0178694 A1 Jun. 11, 2020

Related U.S. Application Data

(60) Provisional application No. 62/777,957, filed on Dec. 11, 2018.

(51) Int. Cl.
*A47C 3/34* (2006.01)
*A47C 7/72* (2006.01)
(Continued)

(52) U.S. Cl.
CPC ............... *A45F 3/44* (2013.01); *A01K 97/10* (2013.01); *A47C 7/004* (2013.01); *A47C 7/008* (2013.01);
(Continued)

(58) Field of Classification Search
CPC .. A45F 3/44; A01K 97/10; A47C 7/72; A47C 9/02; A47C 9/10; A47C 7/004;
(Continued)

(56) References Cited

U.S. PATENT DOCUMENTS

| 619,596 | A | * | 2/1899 | Mayer | B60N 2/3011 |
| | | | | | 248/398 |
| 1,194,551 | A | * | 8/1916 | Schossler | A47C 9/002 |
| | | | | | 108/2 |

(Continued)

FOREIGN PATENT DOCUMENTS

| CH | 218030 A | * | 11/1941 | | A47C 7/62 |
| DE | 2109129 A1 | * | 8/1972 | | A47C 7/008 |

(Continued)

OTHER PUBLICATIONS 3 page PDF of machine translation of DE 2109129 A1 to Alfred Biedermann, Published Aug. 31, 1972. (Year: 1972).*

(Continued)

*Primary Examiner* — Robert Canfield
(74) *Attorney, Agent, or Firm* — Boudwin Intellectual Property; Daniel Boudwin

(57) ABSTRACT

A collapsible stool entertainment system. The collapsible stool entertainment system includes an elongated rod having a first end opposite a second end. A seat portion is affixed to the first end and a base portion is affixed to the second end. A plurality of teeth extends from a lower surface of the base portion to engage a ground surface for additional stability. In some embodiments, the second end of the elongated rod is pivotally secured to an upper surface of the base portion via a ball-and-socket joint system, wherein the second end comprises a ball removably securable within a socket disposed on the base portion.

15 Claims, 4 Drawing Sheets

(51) Int. Cl.
*A47C 9/10* (2006.01)
*A45F 3/44* (2006.01)
*A47C 7/00* (2006.01)
*A47C 7/62* (2006.01)
*A47C 9/02* (2006.01)
*A01K 97/10* (2006.01)

(52) U.S. Cl.
CPC .............. *A47C 7/628* (2018.08); *A47C 7/72* (2013.01); *A47C 7/727* (2018.08); *A47C 9/02* (2013.01); *A47C 9/10* (2013.01)

(58) Field of Classification Search
CPC ......... A47C 7/628; A47C 7/008; A47C 7/727; A47C 3/40; A47C 7/626; A47C 9/007
USPC ......... 297/4, 45, 183.2, 183.5, 183.6, 183.9, 297/423.1, 423.44, 423.45, 186, 188.08, 297/188.09, 188.1, 217.3, 217.4, 461, 297/313, 314; 248/156, 530, 188.8, 248/188.9, 545, 288.31, 677, 87; 52/155, 52/165
See application file for complete search history.

(56) References Cited

U.S. PATENT DOCUMENTS

| | | | | |
|---|---|---|---|---|
| 1,305,867 | A * | 6/1919 | Atlas | A45B 9/04 135/78 |
| 2,301,385 | A * | 11/1942 | Ehrgott | F16F 1/376 248/346.11 |
| 2,523,817 | A * | 9/1950 | Conley | A47C 3/24 248/405 |
| 2,902,794 | A * | 9/1959 | Ehrgott | A47B 91/12 248/188.9 |
| 3,333,805 | A * | 8/1967 | Marshall | A47G 27/0206 248/188.9 |
| 3,751,845 | A * | 8/1973 | van Leeuwen | A01K 97/06 43/56 |
| 4,099,697 | A * | 7/1978 | Von Schuckmann | A47C 3/026 248/398 |
| 4,366,981 | A * | 1/1983 | Ziegler | A47C 7/029 297/328 |
| 4,833,823 | A * | 5/1989 | Edwards, III | A01G 9/04 108/53.3 |
| 5,269,157 | A * | 12/1993 | Ciminelli | A45B 11/00 280/47.18 |
| D361,505 | S * | 8/1995 | Carioli | D8/374 |
| D362,336 | S * | 9/1995 | Weaver | D3/17 |
| D379,582 | S * | 6/1997 | Adams | D8/374 |
| D383,377 | S * | 9/1997 | Sellers | D7/624.1 |
| 5,743,506 | A | 4/1998 | Adams | A47B 91/00 248/346.11 |
| 5,988,574 | A * | 11/1999 | Podgorski | A47B 91/06 248/188.4 |
| 6,003,944 | A | 12/1999 | Glockl | |
| D435,481 | S * | 12/2000 | Wagner | D11/152 |
| 6,467,843 | B1 * | 10/2002 | Rossborough | A47C 3/34 108/150 |
| 6,840,488 | B2 * | 1/2005 | Ngo | A47B 91/12 248/188.2 |
| D504,248 | S * | 4/2005 | Wagner | D6/403 |
| 6,893,097 | B1 | 5/2005 | Ebensperger et al. | |
| 7,229,054 | B2 | 6/2007 | Hu | |
| 7,431,392 | B2 * | 10/2008 | Tamara | A47C 7/727 297/217.4 |
| 8,720,459 | B2 * | 5/2014 | Moulton | A45B 9/04 135/77 |
| 8,979,184 | B2 | 3/2015 | Stafford et al. | |
| 9,199,567 | B1 * | 12/2015 | Kaufman | F16B 5/0692 |
| 10,303,242 | B2 * | 5/2019 | Evans | G06F 3/02 |
| 10,499,740 | B2 * | 12/2019 | Browne | A47B 91/16 |
| 2003/0139169 | A1 * | 7/2003 | Arreazola, Jr. | H04B 1/086 455/344 |
| 2004/0036305 | A1 * | 2/2004 | Smith | B60N 3/023 296/1.02 |
| 2004/0107982 | A1 * | 6/2004 | Morris | A61H 3/0288 135/77 |
| 2005/0242630 | A1 | 11/2005 | Miller | |
| 2008/0031483 | A1 * | 2/2008 | Hill | H04R 1/028 381/334 |
| 2010/0263398 | A1 * | 10/2010 | Webb | F25D 3/08 62/331 |
| 2016/0187046 | A1 * | 6/2016 | Chen | A45C 11/20 62/239 |
| 2017/0150264 | A1 * | 5/2017 | Nelson | A47C 7/72 |

FOREIGN PATENT DOCUMENTS

| | | | | |
|---|---|---|---|---|
| DE | 202016103557 | U1 * | 11/2017 | A47C 3/029 |
| GB | 2513104 | A * | 10/2014 | A47C 3/34 |

OTHER PUBLICATIONS 7 page PDF of machine translation of Device for supporting the posterior of standing persons Biggel, Franz (Inventor). Roericht, Hans, Prof. (Assignee). DE 3612201 A1. (Published Oct. 15, 1987). (Year: 1987).*

* cited by examiner

COLLAPSIBLE STOOL ENTERTAINMENT SYSTEM

CROSS REFERENCE TO RELATED APPLICATIONS

This application claims the benefit of U.S. Provisional Application No. 62/777,957 filed on Dec. 11, 2018. The above identified patent application is herein incorporated by reference in its entirety to provide continuity of disclosure.

BACKGROUND OF THE INVENTION

The present invention relates to collapsible stools. More particularly, the present invention pertains to collapsible stools having a plurality of teeth along a lower surface thereof for engaging a ground surface.

Many people enjoy sitting on stools or chairs in outdoor environments, such as during camping, fishing, or hunting trips, rather than sitting directly on the ground. The ground is often uneven, uncomfortable, and can soil a camper's clothes. Traditional portable seating options are often uncomfortable or difficult to transport, leading to frustration as the user attempts to set up the seat or sit for extended periods. Additionally, traditional seating options are not suitable for uneven terrain, leading to the user being canted at a further uncomfortable angle while seated thereon. This also causes instability, potentially causing the seat to tip over while in use, risking injury to the user. Therefore, there is need in the art for a device that can securely adhere to a ground surface, while also remaining adjustable for a desirable height or to counteract uneven terrain.

In light of the devices disclosed in the known art, it is submitted that the present invention substantially diverges in design elements from the known art and consequently it is clear that there is a need in the art for an improvement to existing collapsible stools. In this regard, the instant invention substantially fulfills these needs.

SUMMARY OF THE INVENTION

In view of the foregoing disadvantages inherent in the known types of collapsible stool now present in the known art, the present invention provides a collapsible stool wherein the same can be utilized for providing convenience for the user when securing the stool to a ground surface via a plurality of teeth disposed on a lower surface thereof.

The present system comprises an elongated rod having a first end opposite a second end, wherein a seat portion is affixed to the first end and a base portion is affixed to the second end. A plurality of teeth extends from a lower surface of the base portion, wherein the plurality of teeth is configured to engage a ground surface to provide stability to the base portion. In some embodiments, the elongated rod is telescopically adjustable in length, such that the elongated rod selectively moves between an extended position and a collapsed position. Additionally, in such embodiments, the second end comprises a ball removably securable within a socket disposed centrally on an upper surface of the base portion, such that the second end is pivotally secured to the base portion via a ball-and-socket joint. In this way, the collapsible stool can be stabilized on a ground surface via the plurality of teeth, and the seat portion can be pivoted to provide a level seating surface for the user relative to the ground surface.

In some embodiments, the seat portion is rotatably affixed to the first end, such that the seat portion rotates about a longitudinal axis of the elongated rod. In another embodiment, lower side of the seat portion is configured to rest flush against the upper surface of the base portion when the elongated rod is in the collapsed position. In other embodiments, a recess is disposed within the lower side of the seat portion, the recess configured to receive the socket therein, such that the lower side and the upper surface rest flush against each other in the collapsed position. In this way, the collapsible stool comprises a smaller form factor to aid in transport and storage thereof.

In some embodiments, a lid is hingedly affixed to an upper side of the seat portion, wherein the lid provides access to an interior volume of the seat portion. In other embodiments, the interior volume is divided into a plurality of compartments by at least one wall extending thereacross. In another embodiment, a protrusion extends from a front of the lid, wherein the protrusion is received within a complementary cutout disposed in the seat portion. In this way, the seat portion provides additional storage to the user.

In some embodiments, a speaker is disposed on the seat portion, wherein the speaker is configured to play an audio file from a media storage device operably connected thereto. In other embodiments, a power source is disposed within the seat portion, wherein the power source is operably connected to the speaker. In another embodiment, an exterior port is in operably connection to the power source, wherein the exterior port is configured to transmit power to an external device connected thereto.

In some embodiments, the plurality of teeth is disposed about a perimeter of the base portion. In another embodiment, the plurality of teeth is disposed along the lower surface of the base portion in a series of concentric rings. In other embodiments, a height of each tooth of the plurality of teeth decreases from the perimeter of the base portion to a center of the lower surface. In this way, maximal engagement between the ground surface and the base portion is ensured at the perimeter, thereby providing the greatest stability at the perimeter where forces caused by a weight upon an uneven surface would be greatest.

In some embodiments, a handle is disposed on an exterior surface of the seat portion, wherein the handle is configured to provide a gripping surface to the user. In other embodiments, the handle is affixed to a retractable strap configured to automatically retract about a spool disposed within the seat portion. In this way, the handle can extend to provide a comfortable carrying method, while retracting when not in use to minimize form factor.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
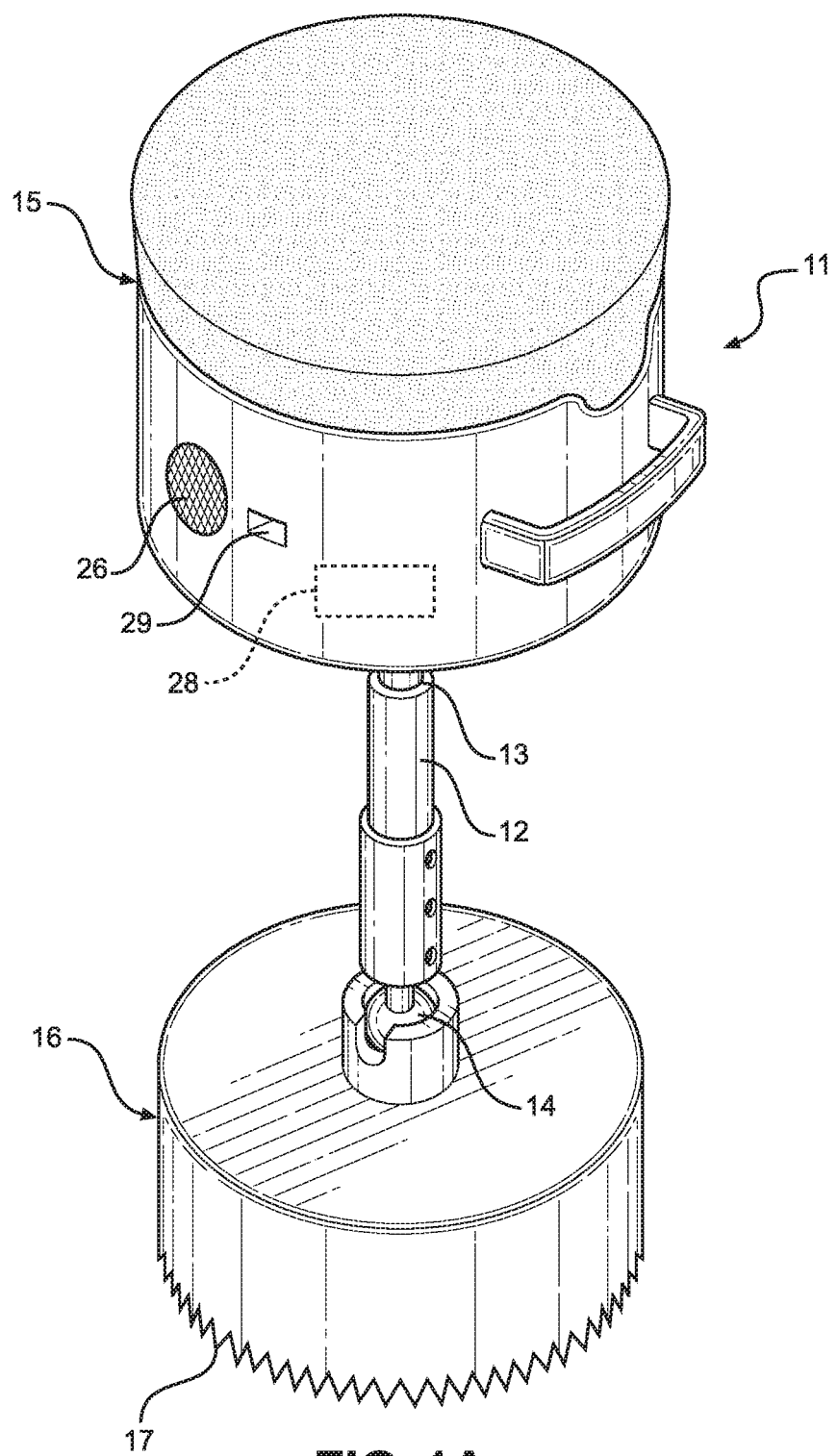
FIG. 1A shows a perspective view of an embodiment of the collapsible stool entertainment system in an extended position.

Reference is made herein to the attached drawings. Like reference numerals are used throughout the drawings to depict like or similar elements of the collapsible stool. The figures are intended for representative purposes only and should not be considered to be limiting in any respect.

Figure 1B:
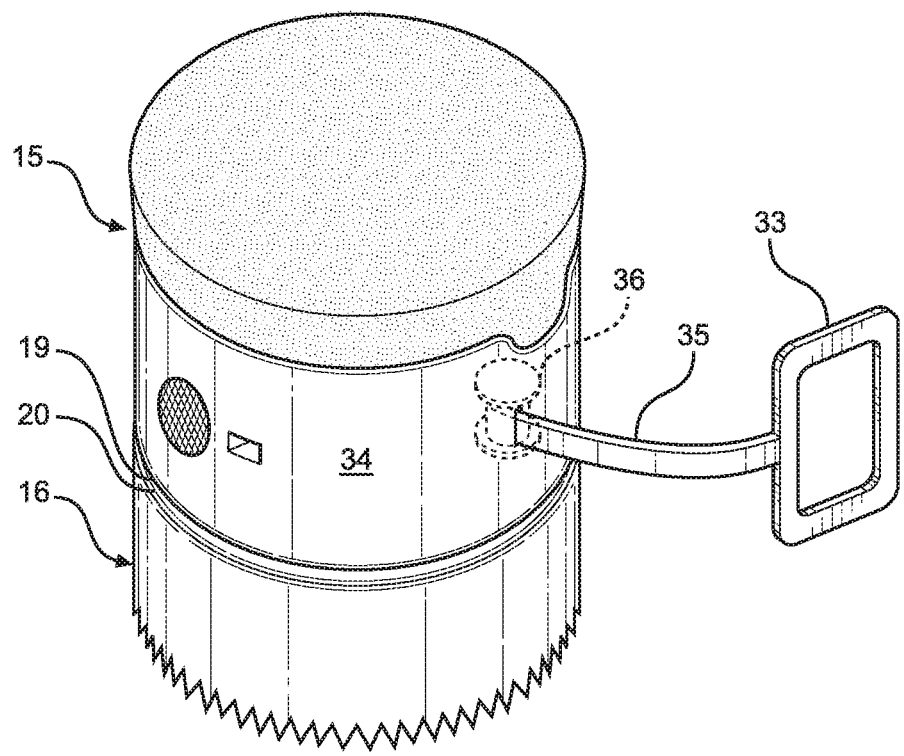
FIG. 1B shows a perspective view of an embodiment of the collapsible stool entertainment system in a collapsed position.

Referring now to FIGS. 1A and 1B, there is shown a perspective view of an embodiment of the collapsible stool entertainment system in the extended position and a perspective view of an embodiment of the collapsible stool entertainment system in the collapsed position, respectively. The collapsible stool entertainment system 11 comprises an elongated rod 12 having a first end 13 disposed opposite a second end 14. A seat portion 15 is affixed to the first end 13 and a base portion 16 is affixed to the second end 14. The base portion 16 is configured to removably secure to a ground surface and provide stability to the seat portion 15, such that a user can be supported thereon. A plurality of teeth 17 is disposed on a lower surface of the base portion 16, wherein the plurality of teeth 17 taper to a point to aid in piercing a ground surface. In this way, the collapsible stool entertainment system 11 can easily engage the ground surface to retain a stationary position. In the illustrated embodiments, the seat portion 15 comprises a greater relative height than that of the base portion 16, such that a user is provided with greater storage capacity as described elsewhere herein. In some embodiments, the seat portion 15 is rotatably affixed to the first end 13 of the elongated rod 12, such that the seat portion 15 can rotate about a longitudinal axis thereof. In this way, the user can swivel the seat portion 15 about the elongated rod 12, such that the user can position themselves relative to the stationary base portion 16 as desired.

In the illustrated embodiment, the elongated rod 12 is adjustable in length via a telescopic means, such that the elongated rod 12 is selectively movable between an extended position (as shown in FIG. 1A) and a collapsed position (as shown in FIG. 1B). In such embodiments, the elongated rod 12 can be locked at a desired length via a locking mechanism, such as a spring biased ball-detent system configured to extend through a plurality of apertures disposed through the elongated rod 12. Alternate locking mechanisms are contemplated, such as frictional engagement of each portion of the elongated rod 12, such that the elongated rod 12 remains at a desired length. In the illustrated embodiment of FIG. 1B, the lower side 19 of the seat portion 15 rests flush against an upper surface 20 of the base portion 16 when the collapsible stool entertainment system 11 is in the collapsed position. In this way, the form factor of the collapsible stool entertainment system 11 is minimized when in the collapsed position to provide convenience to the user during transport and storage.

In the illustrated embodiments, a handle 33 is disposed on an exterior surface 34 of the seat portion 15, wherein the handle 33 is configured to provide a gripping surface to the user for assisting in the transport of the collapsible stool entertainment system 11. In the illustrated embodiment of FIG. 1A, the handle 33 is integral with the seat portion 15. In the shown embodiment of FIG. 1B, the handle 33 is affixed to a retractable strap 35, wherein the retractable strap 35 is configured to wind about a spool 36 disposed within the seat portion 15. In this embodiment, the retractable strap 35 is configured to automatically retract within the seat portion 15 about the spool 36 when external forces are released, thereby ensuring that when the handle 33 is not actively in use, the handle 33 rests flush against the seat portion 15. In this way, the handle 33 is extendable from the seat portion 15, allowing a user to achieve increased leverage when carrying the collapsible stool entertainment system 11 over embodiments with an integral handle 33, while still maintaining a minimal form factor when the handle 33 is not in active use.

In the illustrated embodiments, the seat portion 15 further comprises a power source 28 disposed therein, wherein the power source 28 is operably connected to an exterior port 29, such as a USB port or other electrical connection means. The power source 28 can comprise an internal battery or the like. The exterior port 29 is configured to transmit power from the power source 28 to an external device, such as a smartphone, laptop, tablet, or the like, thereby providing charging capabilities to the user. In the shown embodiments, a speaker 26 is disposed on the exterior surface 34, wherein the speaker 26 is configured to operably connect to a media storage device. In some embodiments, the media storage device is disposed within the seat portion 15, however, in alternate embodiments, the media storage device is located on an external device, such as a smartphone, tablet, or the like. In this way, the speaker 26 is configured to operably connect, such as via a wired or wireless connection, to the media storage device, such that the speaker 26 can play an audio file stored thereon.

Figure 2:
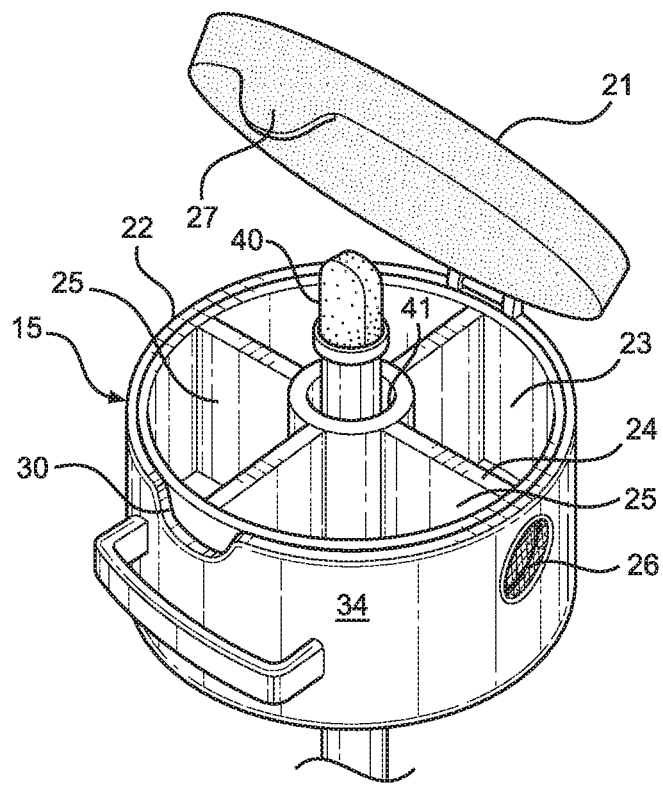
FIG. 2 shows a perspective view of the interior volume of an embodiment of the collapsible stool entertainment system.

Referring now to FIG. 2, there is shown a perspective view of the interior volume of an embodiment of the collapsible stool. In the illustrated embodiment, a lid 21 is hingedly affixed to an upper side 22 of the seat portion 15. The lid 21 provides access to an interior volume 23 of the seat portion 15, wherein the interior volume 23 provides storage to the user. In the illustrated embodiment, the lid 21 removably secures to the upper side 22 such that the interior volume 23 in enclosed thereby. In the shown embodiment, the lid 21 further comprises a protrusion 27 removably securable within a cutout 30 disposed on the seat portion 15. In such embodiments, the protrusion 27 secures within the cutout 30 via friction fit, such that the lid 21 remains sealed against the upper side 22 during transport or the like. In some embodiments, a top side of the lid 21 further comprises a padded material thereon, wherein the padded material is configured to provide cushioning to the user. In the shown embodiment, the lid 21 is dimensioned such that an exterior thereof is flush with the exterior surface 34 of the seat portion 15, when the lid 21 is secured to the upper side 22.

In the illustrated embodiment, the interior volume 23 is divided into a plurality of compartments 25 by at least one wall 24 extending therethrough. The plurality of compartments 25 provide separate storage locations for various items, such that the user can separate items stored therein as desired. In the shown embodiment, four compartments are defined by a pair of perpendicular walls. In the illustrated embodiment, a central opening 41 is defined through the interior volume 23, wherein the central opening 41 is configured to receive the first end of the elongated rod therethrough. In some embodiments, the plurality of compartments 25 are defined within an insert removably securable within the interior volume 23 of the seat portion 15, such that the user can remove the items stored within the plurality of compartments 25 by removing the insert from the interior volume 23. In such embodiments, a height of the insert is less than a height of the seat portion 15, such that any electronic components disposed within the seat portion 15 occupy a portion of the interior volume 23 below the insert.

In the illustrated embodiment, the seat portion 15 further comprises a microphone 40 therein. In such embodiments, the microphone 40 is operably connected to the speaker 26, such that a user's voice can be amplified thereby, thereby allowing the collapsible stool to operate as a loudspeaker, megaphone, karaoke machine, or the like. In this way, the user can be entertained by singing along to an audio file played through the speaker 26, cheer on a sports team, or the like. In the shown embodiment, the microphone 40 is removably securable within the central opening 41 of the interior volume 23, such that the microphone 40 is readily transported within the collapsible stool entertainment system. In some embodiments, the microphone 40 comprises a wireless connection with the speaker 26, allowing the user to move about the collapsible stool, whereas in other contemplated embodiments, the microphone 40 is in wired communication with the speaker 26.

Figure 3:
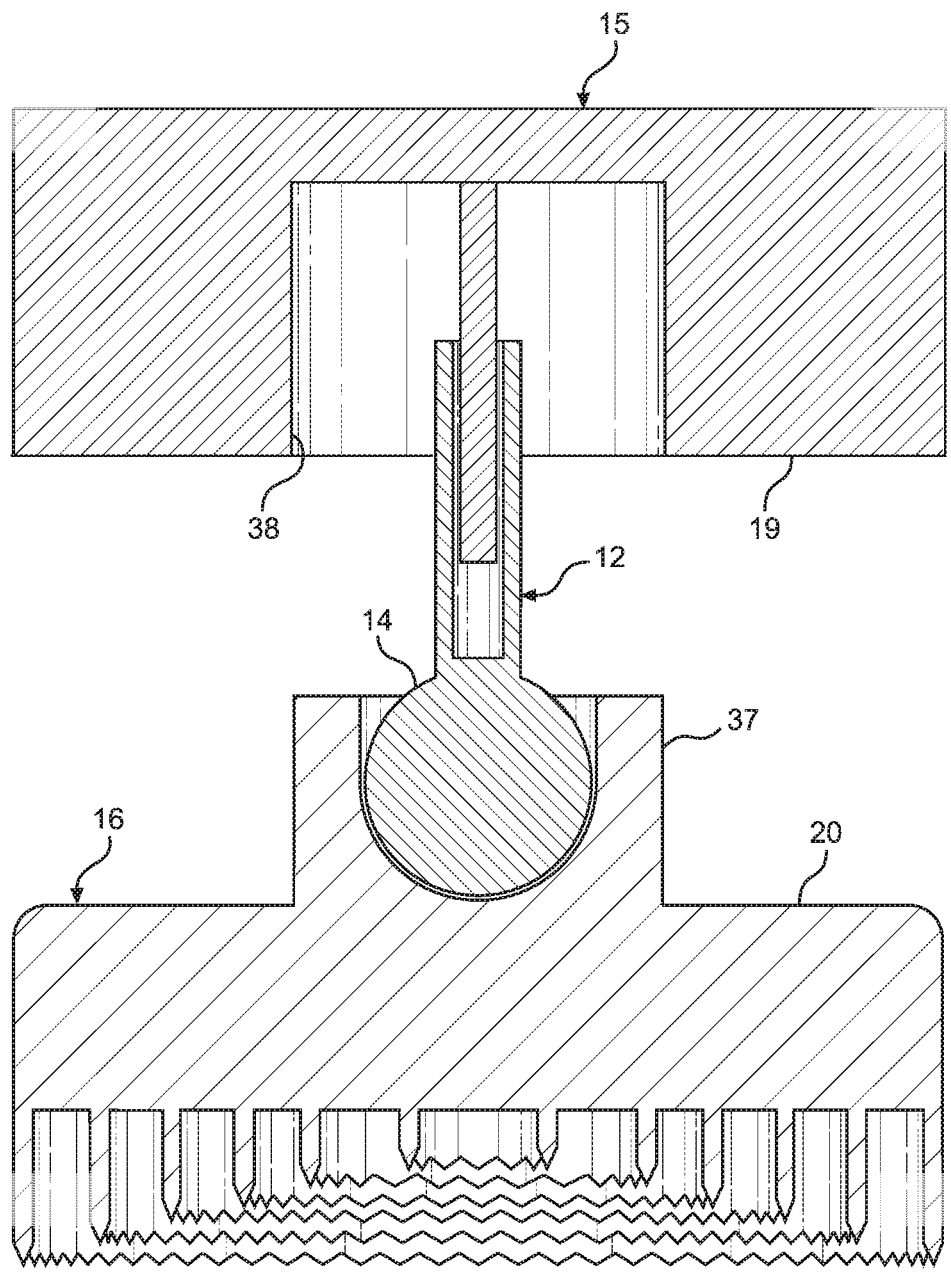
FIG. 3 shows a cross-sectional view of an embodiment of the collapsible stool entertainment system.

Referring now to FIG. 3, there is shown a cross-sectional view of an embodiment of the collapsible stool. In the illustrated embodiment, the elongated rod 12 is pivotally secured to the base portion 16 at a second end 14 thereof, such that the seat portion 15 can be pivoted about the base portion 16. In this way, the user can ensure a level seat portion 15 relative to the ground surface upon which the base portion 16 is engaged. This allows a user to position the base portion 16 on an uneven ground surface, while remaining at a desired angle relative to the ground surface.

In the shown embodiment, the second end 14 comprises a ball removably securable within a socket 37 disposed centrally on the upper surface 20 of the base portion 16. The socket 37 comprises a semi-spherical recess therein, ensuring maximal engagement with the second end 14 of the elongated rod 12. In this way, the second end 14 frictionally engages an interior of the socket 37, such that the seat portion 15 is retained in a desired position when weight is placed thereon. In the illustrated embodiment, the seat portion 15 further comprises a recess 38 disposed on the lower side 19 thereof, wherein the recess 38 is dimensioned to receive the socket 37 therein. In this way, the recess 38 receives the socket 37 therein when the elongated rod 12 is in the collapsed position, such that the lower side 19 can rest flush against the upper surface 20 to minimize form factor.

Figure 4A:
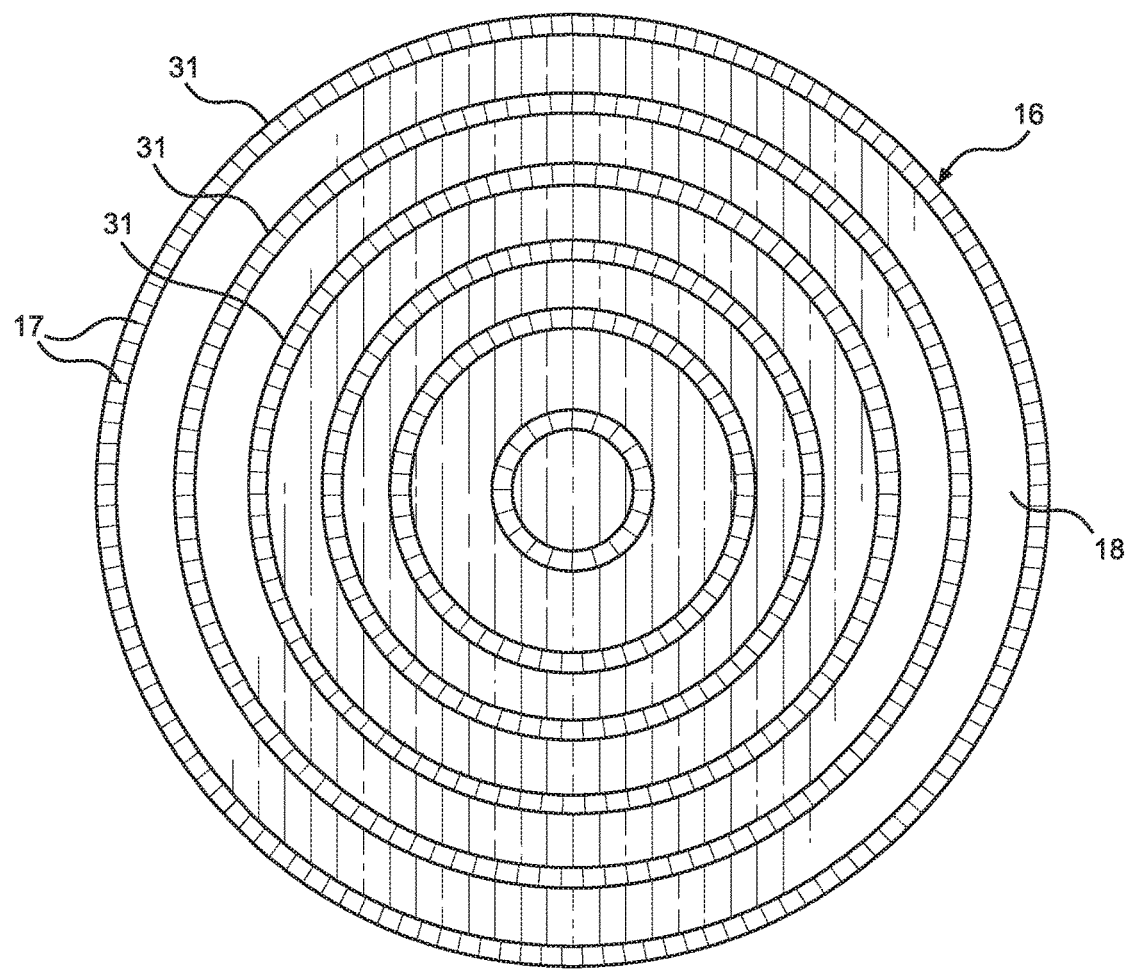
FIG. 4A shows a lower plan view of an embodiment of the collapsible stool entertainment system.
Figure 4B:
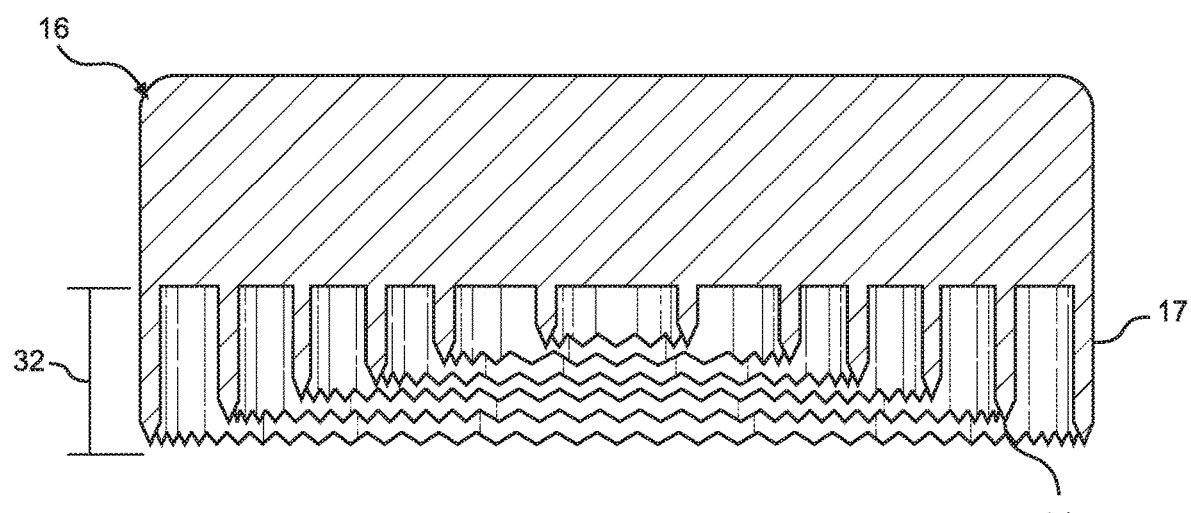
FIG. 4B shows a side plan view of an embodiment of the collapsible stool entertainment system.

Referring now to FIGS. 4A and 4B, there is shown a lower plan view of an embodiment of the collapsible stool and a side plan view of an embodiment of the collapsible stool, respectively. In some embodiments, the plurality of teeth 17 are disposed along a perimeter of the lower surface 18 of the base portion. In the illustrated embodiments, the plurality of teeth 17 are disposed across the lower surface 18 in a series of concentric rings 31. In this way, each concentric ring 31 increases the surface area engaged with the ground surface to further frictionally engage the plurality of teeth 17 therewith. In the shown embodiments, the plurality of teeth 17 taper to a point from each lateral side thereof, such that the plurality of teeth 17 readily pierce a ground surface. As shown in FIG. 4B, the plurality of teeth 17 further taper from a front and rear side thereof. In the illustrated embodiment of FIG. 4B, a height 32 of the plurality of teeth 17 decreases from the perimeter of the base portion 16 towards a center thereof. The greater height 32 of the plurality of teeth 17 along the perimeter of the base portion 16 provides maximal leverage when secured within the ground surface, such that forces placed upon the seat portion during use fail to dislodge the base portion 16 from the ground surface.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A collapsible stool entertainment system, comprising: an elongated rod having a first end opposite a second end; wherein the elongated rod is telescopically adjustable in length, such that the elongated rod selectively moves between an extended position and a collapsed position; a seat portion affixed to the first end of the elongated rod; a base portion affixed to the second end of the elongated rod;
wherein a plurality of teeth extends from a perimeter of a lower surface of the base portion;
wherein the plurality of teeth comprises a series of concentric rings of teeth disposed along the lower surface;
wherein a height of the plurality of teeth decreases from the perimeter towards a center of the lower surface.

2. The collapsible stool entertainment system of claim 1, wherein the seat portion is rotatably affixed to the first end, such that the seat portion rotates about a longitudinal axis of the elongated rod.

3. The collapsible stool entertainment system of claim 1, wherein a lower side of the seat portion rests flush against an upper surface of the base portion when in the collapsed position.

4. The collapsible stool entertainment system of claim 1, further comprising a lid hingedly affixed to an upper side of the seat portion, the lid providing access to an interior volume of the seat portion.

5. The collapsible stool entertainment system of claim 4, wherein the interior volume of the seat portion includes a wall dividing the interior volume into a plurality of compartments.

6. The collapsible stool entertainment system of claim 1, further comprising a speaker disposed within the seat portion, wherein the speaker is operably connected to a media storage device, such that the speaker is configured to play an audio file stored on the media storage device.

7. The collapsible stool entertainment system of claim 1, further comprising a power source disposed within the seat portion.

8. The collapsible stool entertainment system of claim 7, wherein the power source is operably connected to an exterior port configured to transmit power to an external device.

9. The collapsible stool entertainment system of claim 1, further comprising a handle disposed on an exterior surface of the seat portion.

10. The collapsible stool entertainment system of claim 9, wherein the handle is affixed to a retractable strap configured to automatically retract about a spool disposed within the seat portion.

11. A collapsible stool entertainment system, comprising:
an elongated rod having a first end opposite a second end;
wherein the second end comprises a ball;
wherein the elongated rod is telescopically adjustable in length, such that the elongated rod selectively moves between an extended position and a collapsed position;
a seat portion affixed to the first end of the elongated rod;
a base portion having a socket disposed centrally on an upper surface thereof;
a recess disposed within a lower side of the seat portion;
wherein the recess is configured to receive the socket therein when the elongated rod is in the collapsed position;
wherein the second end is pivotably secured within the socket, such that the elongated rod can pivot about the second end;
wherein a plurality of teeth extends from a lower surface of the base portion.

12. The collapsible stool entertainment system of claim 11, wherein the plurality of teeth comprises a series of concentric rings of teeth disposed along the lower surface.

13. The collapsible stool entertainment system of claim 12, wherein a height of each ring of teeth decreases from the perimeter towards a center of the lower surface.

14. The collapsible stool entertainment system of claim 11, further comprising a handle disposed on an exterior surface of the seat portion.

15. The collapsible stool entertainment system of claim 14, wherein the handle is affixed to a retractable strap configured to automatically retract about a spool disposed within the seat portion.

* * * * *